United States Patent
Jamison et al.

(10) Patent No.: US 7,324,732 B2
(45) Date of Patent: Jan. 29, 2008

(54) LITHIUM NIOBATE COATED OPTICAL FIBER APPARATUS AND METHOD

(75) Inventors: Tracer Jamison, Washington, DC (US); Douglas V. Keller, Lafayette, NY (US); Philipp Kornreich, North Syracuse, NY (US); James Flattery, Syracuse, NY (US)

(73) Assignee: FanaSys, LLC, East Syracuse, NY (US)

( * ) Notice: Subject to any disclaimer, the term of this patent is extended or adjusted under 35 U.S.C. 154(b) by 0 days.

(21) Appl. No.: 11/551,503

(22) Filed: Oct. 20, 2006

(65) Prior Publication Data

US 2007/0237476 A1 Oct. 11, 2007

Related U.S. Application Data

(60) Provisional application No. 60/728,959, filed on Oct. 21, 2005.

(51) Int. Cl.
*G02B 6/02* (2006.01)

(52) U.S. Cl. ......................................... 385/123; 385/12

(58) Field of Classification Search ................... 385/12, 385/13, 123–128
See application file for complete search history.

(56) References Cited

U.S. PATENT DOCUMENTS

| | | | |
|---|---|---|---|
| 4,363,533 A * | 12/1982 | Stowe et al. ................. | 385/127 |
| 6,072,930 A * | 6/2000 | Kornreich et al. ........... | 385/123 |
| 6,498,877 B1 * | 12/2002 | Chowdhury et al. .......... | 385/37 |
| 6,563,985 B2 * | 5/2003 | Yin et al. ...................... | 385/37 |

\* cited by examiner

*Primary Examiner*—Sarah Song
(74) *Attorney, Agent, or Firm*—George R. McGuire; David L. Nocilly; Bond, Schoeneck & King, PLLC

(57) ABSTRACT

An optical fiber sensor having a central core, a cladding layer disposed about the central core, and a thin film of lithium niobate positioned between the core and the cladding layer. Each of the cladding layer and the central core are made from glass materials having different indices of refraction. The refractive index of the lithium niobate film changes when stress is applied to the optical fiber sensor. Accordingly, stress may be detected and measured by detecting and measuring the modulation of light passing through the optical fiber sensor while the stress is occurring.

20 Claims, 5 Drawing Sheets

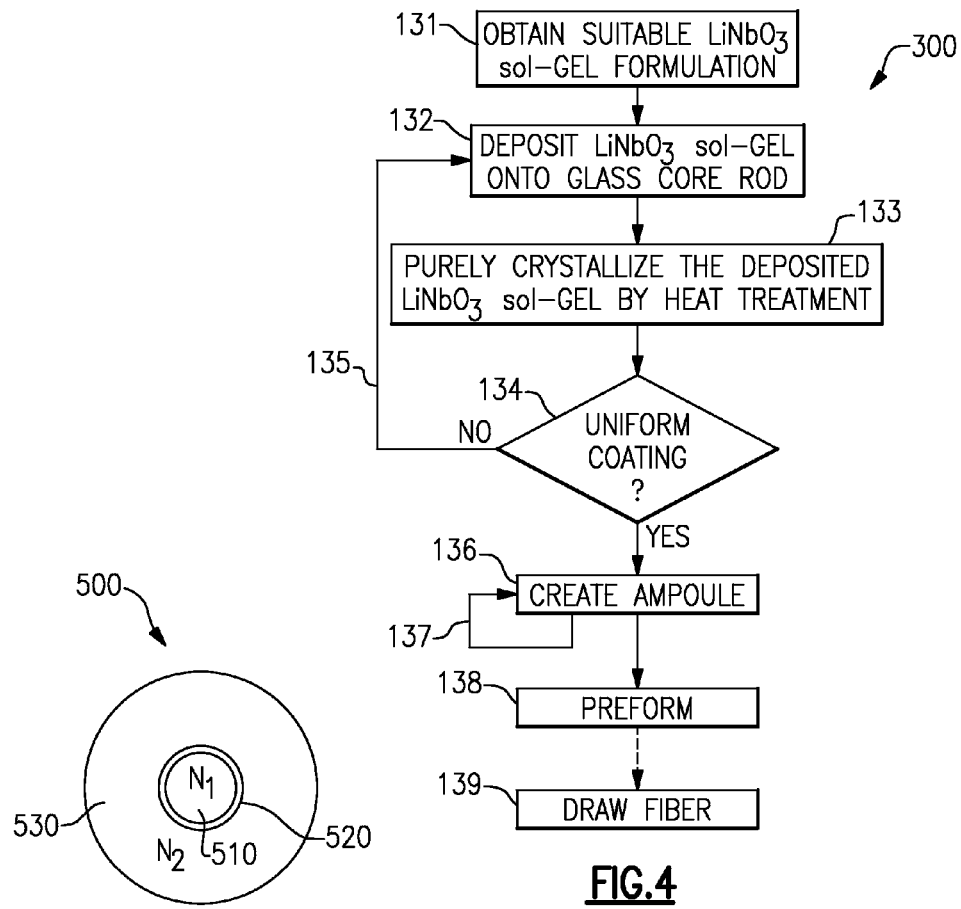
FIG.4
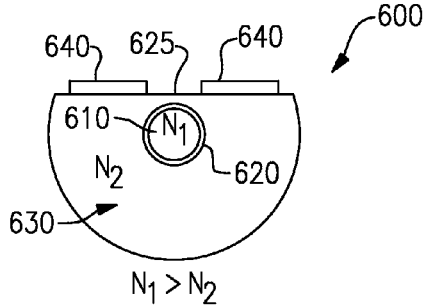
FIG.6
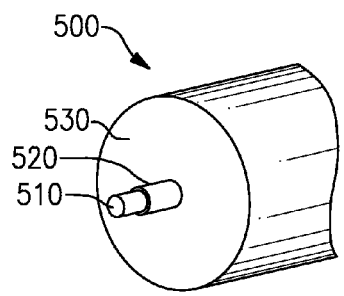
FIG.8
FIG.7

LITHIUM NIOBATE COATED OPTICAL FIBER APPARATUS AND METHOD

CROSS-REFERENCE TO RELATED APPLICATIONS

This application claims priority to U.S. Provisional Patent Application Ser. No. U.S. 60/728,959, filed on Oct. 21, 2005.

BACKGROUND OF THE INVENTION

1. Field of the Invention

The present invention relates to optical fibers and, more particularly, to a single-mode optical fiber having an inter-core coated film of lithium-niobate fiber acting as a modulator/sensor.

2. Description of the Related Art

As shown in FIG. 1, an ordinary optical or plain fiber 10 is a wave-guide through which light is propagated by continuous total internal reflection within a glass central core 14 of the fiber. The glass surrounding the central core 14 is known as the cladding 18. Both core 14 and cladding 18 are dielectric materials. Because the index of refraction ($n_1$) of core 14 is made to be higher than that of the surrounding cladding ($n_2$), light waves remain trapped within core 14 during transmission. Depending on the wave modes that are utilized in transmission through the core 14, optical fibers 10 may be generally classified as single-mode or multi-mode fibers. Multi-mode fibers typically have core diameters of either 50 or 62.5 µm and can be used for sensors that reply on intensity modulation. Single-mode fibers, on the other hand, have core diameters typically in the range of 3 to 10 µm. Long distance communication and data transmission lines are generally comprised of single-mode sized fibers.

Advancements in photonics and fiber optic technology have revolutionized high speed data communication. In the current state of these technologies, the dominant role of optic fibers is for data transmission. Data, in the form of photons or light, is transmitted through optic fiber lines reliably and securely at very high speed and over a wide frequency band. To meet optimal requirements on integrity and quality of data transmission, the characteristics of the input and output light through the carrier optic fiber are desired to remain unchanged. Thus, the fiber optic line is ideally intended to function as a conduit preserving the intensity, frequency, phase and polarity of the light beam as best possible. In addition to high speed and broadband, fiber optic lines remain immune to effects from electromagnetic interference, interception, heating and arching. These advantages over wire and wireless data transmission media inspired aggressive investment in fiber optic trunk lines in the past decades.

The next phase of the fiber optic revolution is modulation while in transmission. Characteristics of light beam are desired to alter in proportion to physical, thermal, chemical and biological changes. The intention to maximize modulation of a selected light beam property or properties, however, is diametrically opposite to the desired objective of minimizing differences between input and output light in data transmission. Fiber segments that accentuate changes of characteristics desired to be preserved in data transmission are inserted in a network to detect or register relative changes. These fiber segments modulate transmitted light properties by virtue of induced changes in intrinsic or extrinsic conditions. Changes in intensity, frequency, phase, polarity and travel time have been exploited to develop a wide variety of sensors. The speed, reliability, accuracy, range and physical size make fiber optic sensors potentially attractive for a broad spectrum of applications. Incorporation of single or distributed fiber optic sensors within control loop circuits can lead to advances in smart materials and structures, intelligent transportation systems, energy conservation, clean environment, enhanced surveillance and in many fields of science and technology.

The main components of a control loop consist of transmission, detection, processing and actuation. Because of cost and relative development, practical circuits at present consist of mixed electronic and photonic components. The extent of photonic transmission would depend whether the circuit constitutes remote or local control and detection. For remote conditions, the bulk of the transmission can be in existing fiber optic lines. Local sensing and control loops can be fully electronic except for the sensing segment that would remain in photonic mode. Processing and actuating components would be in electronic mode for either local or remote loops. Circuits consisting entirely of photonic transmission, sensing, processing and actuation are not practical or economical at this time. The light input and output to and from the sensor can originate and terminate from a remote site or from close proximity to the sensor. The output is converted to electrical signal for processing and control decision. In turn, the processor controls actuators to initiate an adaptive response. This cycle continues to maintain set objectives for the system operation. An example would be to use sensor input and output to determine the axle load and wheelbase of a vehicle and the control decision may be to collect an appropriate toll charge for the vehicle. If successive sensors are linked, the toll can reflect also the travel time and speed of the vehicle. In addition, the toll can also reflect the time of day and level of traffic. Such a system would revolutionize the efficiency, energy conservation, law enforcement and safety of the highway system. While the technology for such a system exists, associated costs and complexity remain high.

With the above background provided, it is well known that splicing of very different core sized fiber segments introduces excessive leakage and thus single mode and multi mode fibers cannot be coupled. Apart from other inherent limitations, multi mode fiber sensors cannot be integrated within an existing trunk line communication fiber grid network. Commonly used fiber optic sensors for pressure and strain detection typically consist of segments of single mode sized fibers that contain Bragg interference gratings. When the sensor segment is subjected to changes in pressure and compliant strain, the grate spacing becomes altered. Such changes modulate the light wave passing through the sensor segment. A monochromatic light source of high intensity and interferometer detectors are usually required for this sensor system wherein the cost of such systems can be of the order of several thousand dollars.

U.S. Pat. No. 6,072,930 issued to Kornreich et al., the disclosure of which is hereby incorporated by reference in its entirety, discloses a method for placing a thin film of semi-conductor material between the core and cladding of a fiber preform, and drawing an optical fiber from the preform.

In the field of telecommunications, optical modulators in the form of thin films are widely used. Lithium niobate is a popular electro-optic material that is frequently used as a channel waveguide modulator with thin film metal electrodes being deposited on its planar surfaces. A prior art electro-optical modulator 38 is depicted herein at FIG. 2. As illustrated, in the lumped Mach Zehnder interferometer configuration waveguide 40, a lithium niobate coated rectangular wafer 44 is coupled into a fiber network. Light enters the network and is divided by a splitter 46 along two paths as shown; an upper path 48 containing the lithium niobate waveguide and a lower path 52 comprising an optical fiber with a known fixed time delay. The fiber path 48 containing the lithium niobate waveguide functions as a variable delay path due to the variation in the index of refraction of the lithium niobate structure when an electric field is applied. Light from the two paths 48, 52 is combined at the output end of the system and will constructively or destructively interfere depending upon the delay that is provided by the lithium niobate waveguide. A noted shortcoming of such a commercially available electro-optic modulator arises from the inefficient coupling of the rectangular waveguide structure into the otherwise all-fiber network. Coupling losses due to connection pig-tailing can approach or exceed fifty percent (50%). In addition, the particular way in which the lithium niobate crystals are grown may result in performance issues with such a device.

In the field of sensing, optical fibers wrapped around piezoelectric sensitive mandrels are often used to sense sound waves in underwater applications, such as oil and geological surveys, military surveillance, among others. As illustrated in FIG. 3, a plain optical fiber 60 is wrapped around a mandrel hydrophone 64, which is sensitive to sound, and also similarly wrapped around a mandrel 66 that is insensitive to sound. The wrappings are made in a Mach Zehnder interferometer configuration as described above; i.e., an input signal is split and directed along two different paths, one path 68 of which is sensitive to sound and the other path 69 which is not sensitive to sound. In the presence of sound vibrations, the sensitive mandrel 64 will sufficiently change to cause a slight path length change in the wrapped fiber 60, thereby effecting the phase of the signal in that leg of the device. When the signals recombine at the output, they will interfere either constructively or destructively. Again, integration losses for this type of device geometry are high.

BRIEF SUMMARY OF THE INVENTION

It is therefore a principal object and advantage of the present invention to provide a low cost sensor system.

It is a further object and advantage of the present invention to provide a sensor system with lower coupling losses.

It is an additional object and advantage of the present invention to provide a sensor system with lower interference.

In accordance with the foregoing objects and advantages, the present invention provides an electro-optic modulator/sensor having a thin lithium niobate (LiNbO$_3$) film at the core/cladding interface of an optical fiber. The optical fiber is drawn from a fiber preform that is processed with a sol-gel formulation of lithium niobate so as to have a thin film sol-gel layer of lithium niobate between the core and cladding regions of an optical fiber preform. The fiber includes a central core and a cladding layer disposed about the core wherein the central core and the cladding layer are each made from glass materials having different indices of refraction. A thin film of lithium niobate is disposed between the core/cladding interface wherein the lithium niobate is sensitive to changes in stress and strain to cause light to modulate through the fiber.

The lithium niobate layer has an index of refraction that is caused to change upon imposition of stress or strain induced through physical means or by creation of an electric field. In one version, the fiber includes in cross section a polished flattened cladding region wherein the fiber assumes a substantially D-shaped geometry. This geometry permits the attachment of electrodes onto the flattened cladding region wherein an electric field can be created across the electrodes and the lithium niobate layer. The sensitivity of the lithium niobate layer to the creation or variations in the electric field permit the fiber to act as an electro-optic modulator for a variety of applications, such as, for example, determining sources of electromagnetic interference (EMF), radio frequency (RF) signals, or in which according to another to other applications, the fiber can be used in optical switching operations.

According to one embodiment, the optical fiber according to this invention is made using a preform including the general steps of depositing a suitable sol-gel formulation of lithium niobate onto a glass core rod, heat treating the coated material so as to remove the organics from the lithium niobate sol-gel, repeating the above steps so that the entire core rod is covered with a substantially uniform layer of lithium niobate sol-gel, forming an ampoule containing the crystallized lithium niobate core rod, and then redrawing the ampoule and repeating the ampoule creation step, as necessary, to create the desired optical fiber preform.

According to another embodiment of the invention, lithium niobate fiber optic sensors and systems can be used for detection of load or pressure and strain or deformation changes that occur in a host material. The host material can be a component of a system, such as a part of a bridge, or a selected material, such as a geofoam, for example, that provides a protective and compliant medium to which the lithium niobate fiber would be securely attached. The compliance of the host material and imposed physical changes on the bonded or attached lithium niobate fiber segment can be calibrated to operate as sensors.

According to an embodient of the fiber optic device embodiment, the device has a modulation capacity between about fifteen percent (15%) to fifty percent (50%). In another embodiment, the fiber device described herein has a modulation capacity between about twenty-five percent (25%) to fifty percent (50%). The D-shaped fiber would have less coupling losses, but would require a larger electric field, comparatively, for the same degree of modulation.

A varied number of suitable applications can be made using the optical fiber of the present invention. For example and as noted above, the fiber can be used as an electro-optic fiber modulator. According to another exemplary aspect, the fiber can be used as an acousto-optic fiber sensor. The fibers drawn from the perform can assume a number of shapes and cross sections in order to facilitate or determine the presence of stresses and strains on the imposed film layer. For example, the optical fiber can assume a substantially D-shaped cross-section, as described above, enabling electrodes to be vacuum deposited or otherwise attached to planar sections of the cross section and enabling the creation of an applied electric field across the electrodes and the lithium niobate film layer. In another embodiment, an optical fiber drawn from the disclosed preform can assume a circular, elliptical or other suitable cross-section. The lithium-niobate fiber optic sensors may be used in smart materials and structures, intelligent transportation systems, clean air and energy conservation measures, seismic hazard mitigation, sonar detection, surveillance and security enforcements.

BRIEF DESCRIPTION OF THE DRAWINGS

The present invention will be more fully understood and appreciated by reading the following Detailed Description in conjunction with the accompanying drawings, in which:

FIG. 4 is a flow chart diagram illustrating a method of preforming an optical fiber in accordance with an embodiment of the invention;

FIG. 6 is a schematic cross-sectional illustration of a circular fiber in accordance with an embodiment of the invention;

FIG. 7 is a schematic cross-sectional illustration of a D-shaped fiber according to an embodiment of the invention;

FIG. 8 is a partial perspective view of the circular fiber of FIG. 6;

DETAILED DESCRIPTION OF THE INVENTION

Figure 1:
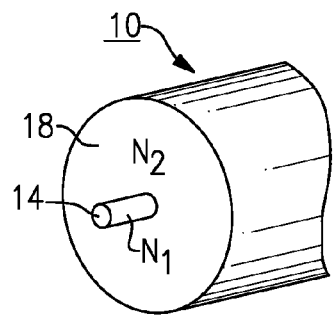
FIG. 1 is a partial perspective view of a prior art optical fiber.
Figure 2:
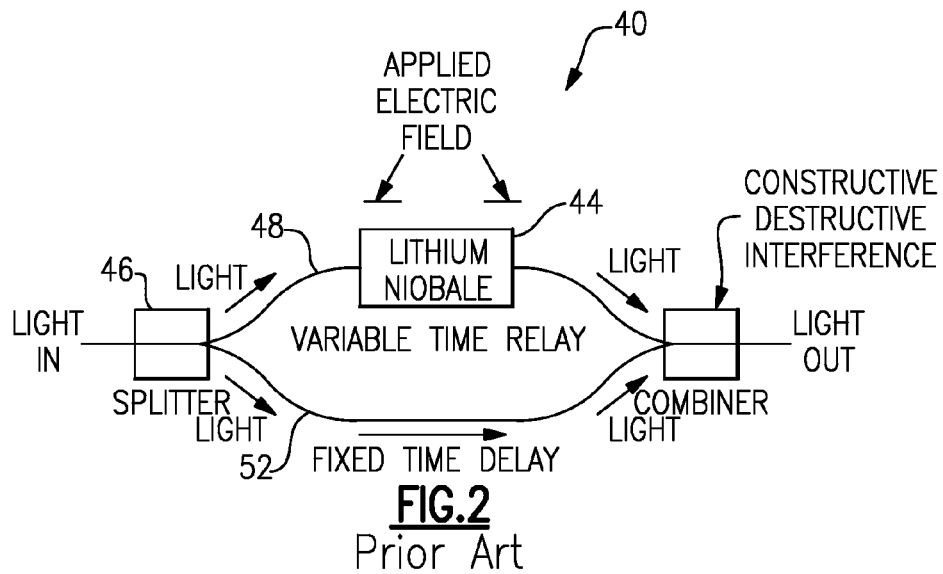
FIG. 2 is a schematic illustration of a prior art electro-optic modulator.
Figure 3:
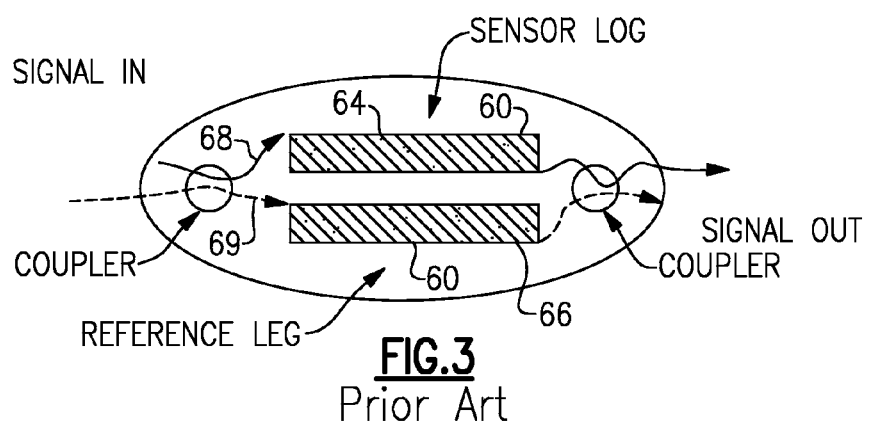
FIG. 3 is a schematic illustration of a prior art acousto-optic sensor.

Referring now to the drawings, wherein like reference numerals refer to like parts throughout, there is seen in FIG. 6 a drawn cylindrical optical fiber 500 according to an embodiment of the present invention. Fiber 500 includes a glass central core 510 having an index of refraction $n_1$, a glass cladding 530 having an index of refraction $n_2$, where $n_1$ is greater than $n_2$, and a uniform, thin film layer of lithium niobate ($LiNbO_3$) 520 disposed between the core 510 and cladding 530. Thin film layer 520 is a sol-gel material formed from lithium niobate ($LiNbO_3$), a crystal with excellent electro-optic and acousto-optic properties. The index of refraction ($n_3$) of thin film $LiNbO_3$ changes slightly and in proportion with the application of an electric field (electro-optic effect) or the application of stress (piezoelectric effect).

There is seen in FIG. 4, a process 300 for making an optical fiber preform that is used to form a lithium niobate optical fiber, such as that shown in FIGS. 6 and 8. Process 300 begins at step 131 with a suitable sol-gel formulation of lithium niobate. Sol-gel technology provides a useful and versatile process for making ceramic, glass and other materials. The process is described, for example, by C. J. Brinker and G. W. Scherer, *Sol-gel* Science, Academic Press, NYC, (1990) and at http://www.chemat.com/html/solgel.html, both references hereby incorporated by reference in their entirety. Various formulations for sol-gel compositions can be found in the literature. For example, Ray et al., Sol-gel derived $Ba(Fe,Ti)O_3$ ferroelectric materials for infrared sensors, *Journal of Applied Physics*, Vol. 88, no. 2, Jul. 15, 2000, pp. 1008-1014, hereby incorporated by reference, discloses a sol-gel formulation for barium niobate ($BaNiO_3$). The formulation described by Ray et al., submitting lithium for the barium component, includes a crystallization temperature for pure, single-phase crystallization of the $LiNbO_3$ that is inconveniently high ($\geq 600°$ C.) for ampoule manufacture by the available technique. The higher temperature, among other things, required the use of Pyrex® glass for making the preform, thereby seriously limiting the scope of process and material utilization.

A suitable sol-gel formulation of $LiNbO_3$ has characteristics that include, among others permitting convenient application to a glass core rod, for example, by dipping or spraying and providing temperature setting compatible with the glass and heat treatment so as to remove the organics from the lithium niobate sol-gel. Moreover, a relatively lower crystallization temperature range (referred to below) eases the restrictions on glass types and fabrication techniques in accord, for example, with that described in U.S. Pat. No. 6,072,930. A suitable $LiNbO_3$ sol-gel formulation may be obtained primarily through the teachings of Weis, R. S., T. K. Gaylord, Lithium Niobate: Summary of Physical Properties and Crystal Structure, *Applied Physics A*, 37, pp. 191-203, 1985; Hench, L. L., West, J. K., The Sol-Gel Process, *Chem. Rev*, 90, 1, pp. 33-72, January-February 1990; Hirano, S. and K. Kato, Formation of $LiNbO_3$ by Hydrolysis of Metal Alkoxides, *Advanced Ceramic Materials*, 2, 2, 1987; Hirano, Shin-Ichi and Kazumi Kato, Preparation of Crystalline $LiNbO_3$ Films with Preferred Orientation by Hydrolysis of Metal Alkoxides, *Advanced Ceramic Materials*, 3, 5, 1988, all of which are hereby incorporated by reference.

According to the present invention, step 132 involves depositing the $LiNbO_3$ onto a glass core rod. The various deposition methods for coating a core rod are known in the art and include, without limitation, dipping and spraying techniques. At step 133, the deposited $LiNbO_3$ layer is heat treated to remove the organics from the $LiNbO_3$ sol-gel. The crystallization temperature should be in the range between about 250° C. to 80° C. In another embodiment of the present invention, a suitable temperature range is between about 300° C. to 450° C. In still another embodiment, a suitable temperature range is between about 350° C. to 400° C. Heat treatment times will generally depend upon factors including sol-gel formulation, coating thickness, crystallization temperature, heat environment, and others appreciated by those skilled in the art. A variety of heat treatment environments are suitable according to the invention, ranging from non-carbon producing open sources to sophisticated vacuum-regulated environments.

The uniformity of the crystallized $LiNbO_3$ layer is determined at step 134, and the deposition and crystallization steps are repeated as necessary as shown at step 135 until a satisfactory uniform crystallization layer covers the core rod. In an aspect according to the embodiment, the total crystallization $LiNbO_3$ coating thickness will be in the range between about 3 μm to 12 μm. As the skilled artisan will appreciate, it is the core region of the optical fiber drawn from a preform that guides the signal propagation. Since the refractive index of $LiNbO_3$ will typically be higher than that of the core glass, a too thick coating of the $LiNbO_3$ will result in the signal being guided in the coating layer rather than in the core region of the fiber. As will be described further below, an approximately 6 μm thickness of crystallized $LiNbO_3$ in the finished preform suitably resulted in a thin film layer of $LiNbO_3$ between the core and cladding of the resulting optical fiber between the range of about 30 nanometers to 120 nanometers (i.e., approximately ¹⁄₁₀₀ of the preform coating thickness). At step 136 an ampoule is formed and redrawn as necessary at step 137 until the desired preform is made at step 138.

An optical fiber preform was made first by dipping a glass core rod of approximately a 1 mm diameter in a suitable sol-gel formulation of lithium niobate to coat the core rod. Immediately upon deposition of the lithium niobate solution, the core rod was heat treated to remove the organics from the lithium niobate sol-gel. The glass rod was rotated over a 100° C. hotplate for approximately 24 hours until the LiNbO₃ is properly deposited. Since it appeared that the thin-film layer did not uniformly coat the glass core rod after a single dipping, apparently due to the evaporative nature of the particular sol-gel formulation, the glass rod was repeatedly dipped into the lithium niobate solution and heat treated as necessary in order to uniformly coat the exterior surface of the glass core rod. The thickness of the deposited crystallized LiNbO₃ layer was approximately 6-9 µm. The coated glass rod was then inserted into a glass tube forming the cladding and an ampoule was created by collapsing the glass tube onto the coated glass rod under vacuum. The ampoule was inserted into a larger glass tube and again put through the collapsing process, which was repeated as necessary to create the fiber preform.

Figure 5:
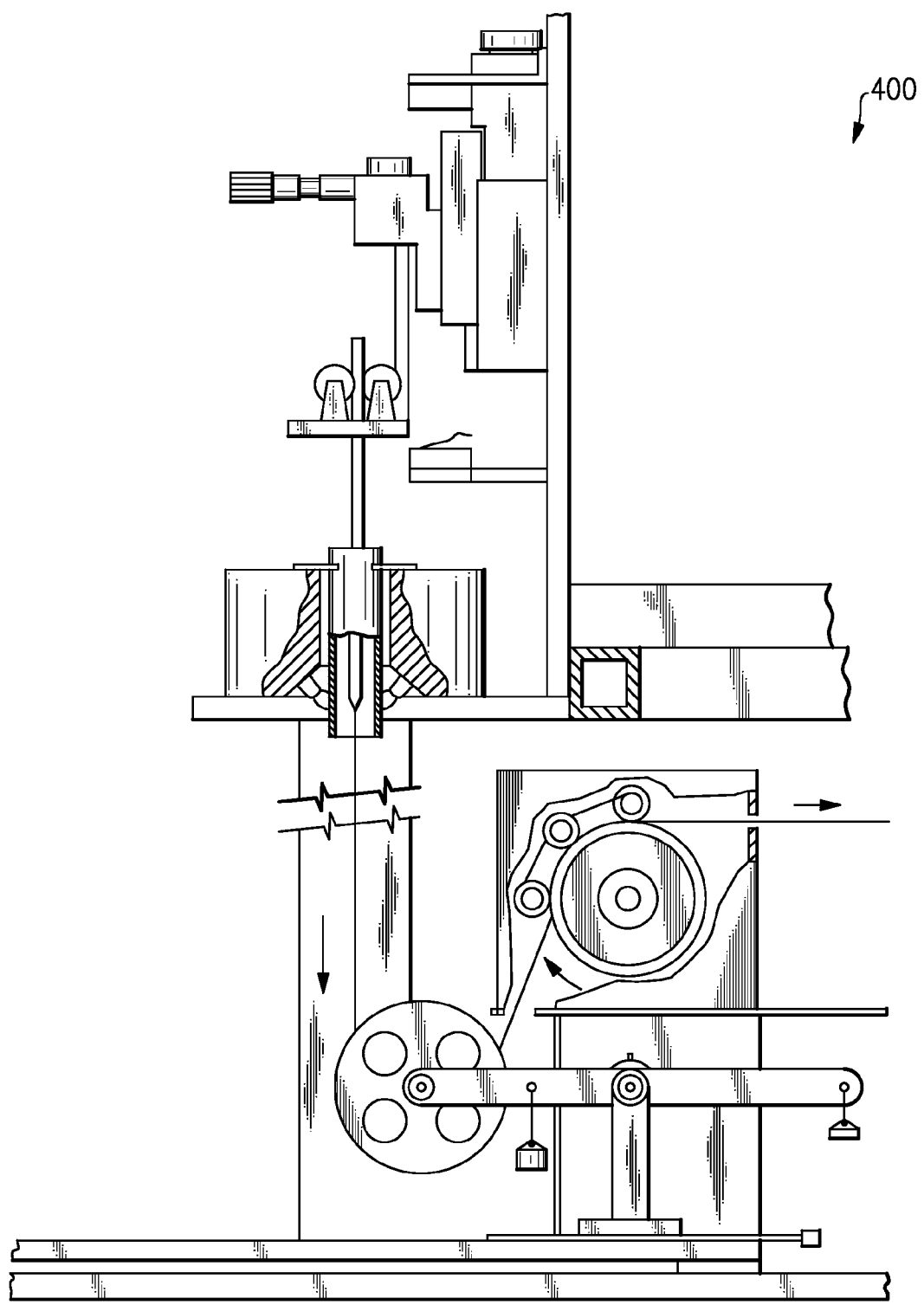
FIG. 5 is a side elevation view of a conventional fiber-drawing tower suitable for drawing an optical fiber made according to an embodiment of the invention.

As described at step 139, an optical fiber can be made from the preform by drawing in any conventional fiber drawing tower apparatus, such as that seen in FIG. 5. Such a fiber drawing tower is more completely described in U.S. Pat. No. 6,072,930.

FIG. 6 illustrates, in cross section, a drawn cylindrical optical fiber 500 according to an embodiment of the invention. The fiber 500 is drawn from the preform described above, including a glass central core 510 having an index of refraction $n_1$, a glass cladding 530 having an index of refraction $n_2$ ($n_1 > n_2$), and a uniform, thin film layer of lithium niobate (LiNbO₃) 520 disposed between the core region and the cladding region. Once the fiber 500 has been drawn, it can be cut or cleaved as known in the art to a desired length for a particular application. To this end, different fiber cross sectional geometries may be obtained, as described herein.

The lithium niobate cylinder fiber 500 described herein has core diameters typically in the range of about 3 to about 10 µm and can mate with single mode core sized data transmission fibers. As noted previously, LiNbO₃ has an index of refraction ($n_3$) which is much greater than either the core or cladding of optical plain fibers, such as those arranged according to FIG. 1. Thus, in a drawn lithium niobate fiber 500, as shown in FIGS. 6 and 8, light mainly propagates in the thin film 520 surrounding the core 510. Upon application of pressure and the development of compliant strain in the fiber 500, attenuation of the propagating light intensity takes place. Light intensity attenuation in the strained segments of the fiber 500 is due to the stress-induced change in the index of refraction ($n_3$) in the thin film 520 where the light propagates. The index of refraction ($n_3$) changes slightly, causing the light propagating in the thin film 520 to leak into the cladding 530. As a result, the intensity of the light detected at the output becomes less than the input, thereby forming a sensor.

In addition to fabricating a sensor in a fiber form, fabrication could alternatively be made in sheet form with a central layer of glass being surrounded on both sides by a sol-gel layer, in the manner previously described, and with a protective glass cladding provided on the outermost layer. The resulting sheet or panel could be incorporated into building facades, road sub-surfaces, bridges, dams, or other infrastructure applications, in which it would be more conducive to use a sensor or modulator in sheet form as opposed to fiber form.

According to another embodiment shown in FIG. 7, an optical fiber according to the present invention may comprise a substantially D-shaped fiber 600 having a glass core 610 with an index of refraction $n_1$ that is surrounded by a glass cladding 630 having a lower index of refraction $n_2$ and has a thin film lithium niobate layer 620 disposed therebetween. In an exemplary embodiment, a surface region 625 of cladding 630 is ground and polished to create a flat surface. Metal contacts 640 may be vacuum deposited on the finished fiber cladding surface region 625. An electric field can then be created across electrodes/contacts 640 and lithium niobate layer 620. As a result, the substantially D-shaped fiber 600, including the metal electrodes 640, is suitable for use as an electro-optic modulator in which variations in the electric field will cause changes in the index of refraction of the lithium niobate layer 620 and create modulation. Such changes in the electric field could be caused, for example, by electromagnetic field sources (EMF), radio frequency (RF) transmissions, and other effects, wherein the modulator can be used to identify and/or pinpoint the source of such forces.

The modulator can also be used for various switching operations causing disturbances or creation of the electric field depending on the intended application. Cylindrical fiber 500 is also suitable for use as an acousto-optic sensor. Suitable lengths of fiber 500 are in the range between about 1 cm to 10 cm for a stand-alone fiber electro-optic modulator, and between about 1 cm to 30 cm for a stand-alone fiber acousto-optic modulator, but longer lengths can be used depending, for example, on the strength of the signal and extent of modulation desired in a particular circumstance. In an embodiment of a stand-alone fiber-optic device, a demonstrated modulation capacity of between about fifteen percent (15%) to fifty percent (50%) is achieved. In another embodiment, the stand-alone fiber-optic device had a modulation capacity between about twenty-five percent (25%) to fifty percent (50%). In an exemplary embodiment according to embodiments of the invention, the fiber exhibited an average modulation of 26.7%, compared to the average modulation of 1.6% of a plain fiber, as described below. Those skilled in the art will appreciate that applications of the fiber optic devices described herein are not limited to the exemplary aspects described above, but may find other applications including, for example, frequency doublers, Q-switches, waveguides, surface acoustic wave (SAW) devices, and others such as those for determining the presence of EMF (electromotive force), sonic and the detection of radio frequency (RF).

Figure 9A:
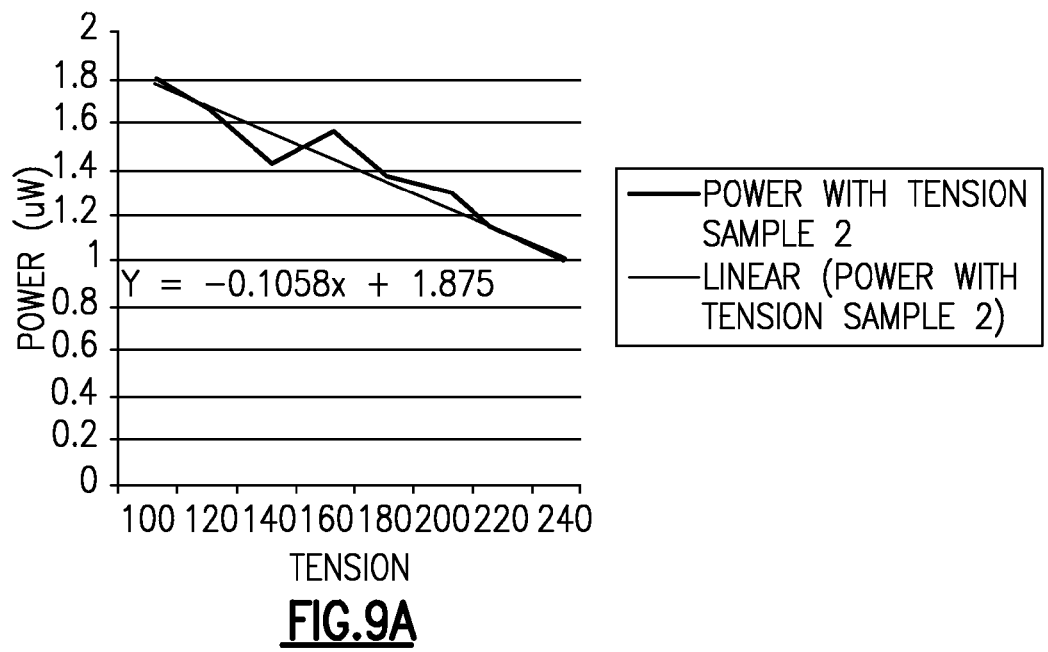
FIGS. 9A and 9B are respective graphs showing a plot of signal transmission through an exemplary lithium niobate cylinder fiber as a function of tension applied to the fiber.
Figure 9B:
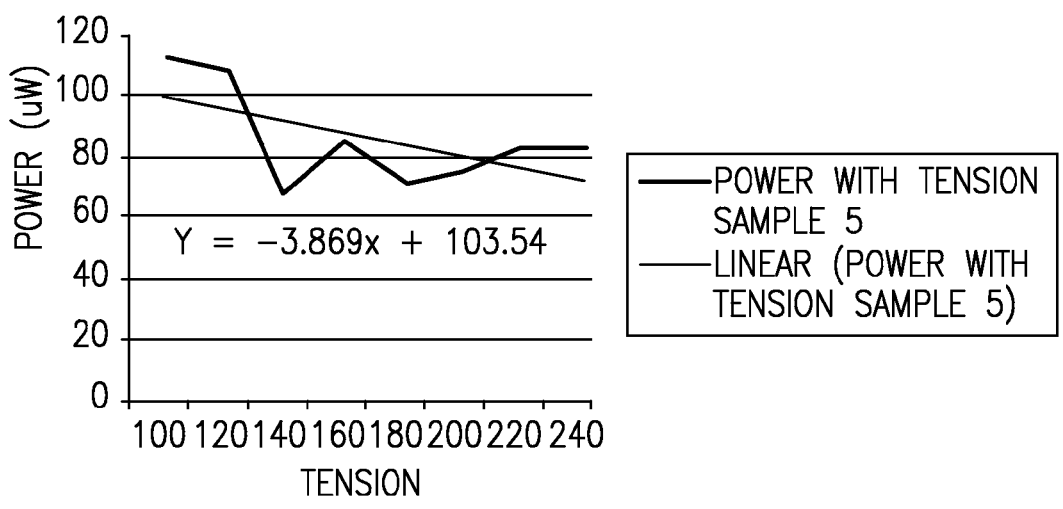

A test configuration was constructed for performing a tension test on a lithium niobate containing fiber segment made according to an embodiment of the invention. As previously noted, lithium niobate (LiNbO₃) is sensitive to stress, strain and electric fields. Also and as previously noted, as stress is applied to lithium niobate, the index of refraction ($n_3$) changes, affecting the light propagating inside the core._Exemplary samples of the lithium niobate cylinder fiber were tested for their response to various levels of stress, and compared to a plain, uncoated, fiber for reference. A 1550 nm and 4 mW light source was connected to a bare fiber adapter, which was used to couple light into the lithium niobate cylinder fiber under test. Both the plain and lithium niobate fiber ends were carefully cut using a cleaver in order to provide good mating end surfaces. The test fiber segments were nominally 50 mm in length and 125 µm were subjected to tension forces that varied between 100-240 gmf. Light was coupled into the fiber under test with the use of a V-groove fiber holder. The power output of the fiber under test was measured with a detector. Power levels were measured as a function of applied tension. Table 1 and FIGS. 9A, 9B contain the results of measurements. (Samples 2 and 5 of Table 1 correspond to FIGS. 9A and 9B, respectively).

TABLE 1

LNC Fiber Tension Testing Results

| LNC Fiber | Begin (µW) | Clamp (µW) | Tension Settings (gmf) | | | | | | | | Slope |
|---|---|---|---|---|---|---|---|---|---|---|---|
| | | | 100 | 120 | 140 | 160 | 180 | 200 | 220 | 240 | |
| Sample 1 | 3.1 | 2.5 | 0.92 | 0.73 | 0.716 | 0.708 | 0.45 | 0.434 | 0.414 | 0.409 | −0.0745 |
| Sample 2 | 4.17 | 3.04 | 1.8 | 1.64 | 1.43 | 1.56 | 1.36 | 1.3 | 1.1 | 1 | −0.1058 |
| Sample 3 | 31 | 26.7 | 22 | 23.4 | 21.4 | 21.9 | 20.9 | 17.9 | 20 | 20 | −0.506 |
| Sample 4 | 39.5 | 34.9 | 2.1 | 1.9 | 2 | 1.88 | 1.2 | 0.935 | 0.8 | 0.414 | −0.2521 |
| Sample 5 | 1.04 | 0.92 | 113 | 108 | 68 | 86 | 72 | 76 | 83 | 83 | −3.869 |
| Sample 6 | 0.924 | 0.56 | 0.56 | 0.544 | 0.54 | 0.535 | 0.536 | 0.513 | 0.517 | 0.52 | −0.0059 |
| Sample 7 | 2 | 1.116 | 1.116 | 1.28 | 1.23 | 1.18 | 1.1 | 1.04 | 1.02 | 1.09 | −0.029 |
| Sample 8 | 48 | 11 | 11 | 5.45 | 6.15 | 6.25 | 6.04 | 6.04 | 5.85 | 5.72 | −0.4226 |
| Sample 9 | 3.1 | 2.5 | 2.5 | 1.65 | 1.53 | 1.94 | 1.53 | 1.44 | 1.27 | 1.16 | −0.1424 |
| Sample 10 | 2.1 | 1.76 | 1.8 | 1.79 | 1.54 | 1.58 | 1.75 | 1.4 | 1.46 | 1.32 | −0.0626 |
| | | | | | | | | | | AVG | −0.0626 |

Figure 10:
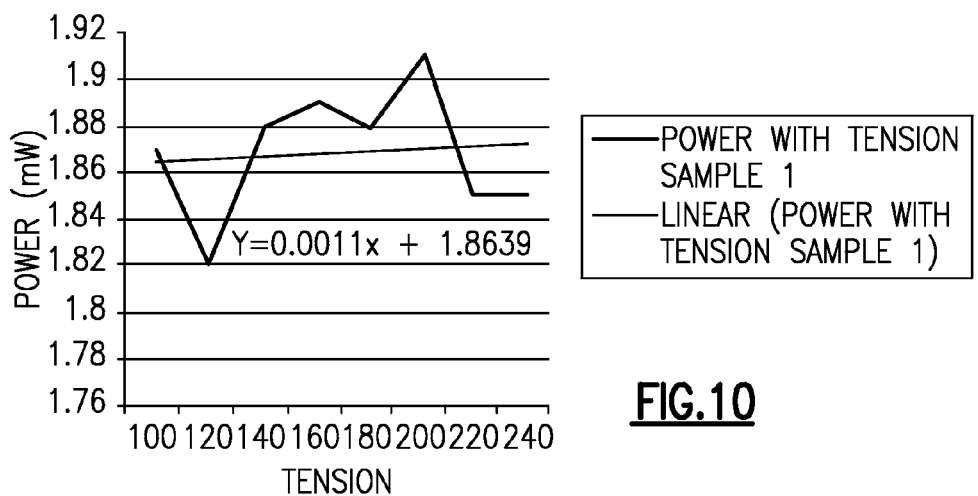
FIG. 10 is a graph showing a plot of signal transmission through a plain (no $LiNbO_3$), fiber as a function of tension applied to the fiber.

A plain fiber was used to compare with the lithium niobate fiber. The plain fiber did not have lithium niobate, but the test conditions were otherwise the same as for the fiber having lithium niobate coating of the core. Table 2 and FIG. 10 illustrate the results. (Sample 1 in Table 2 corresponds with FIG. 10).

TABLE 2

Plain Fiber Tension Testing Results

| Plain SM Fiber | Begin (mW) | Clamp (mW) | Tension Settings (gmf) | | | | | | | | Slope |
|---|---|---|---|---|---|---|---|---|---|---|---|
| | | | 100 | 120 | 140 | 160 | 180 | 200 | 220 | 240 | |
| Sample 1 | 1.9 | 1.86 | 1.87 | 1.82 | 1.88 | 1.89 | 1.88 | 1.91 | 1.85 | 1.85 | 0.0011 |
| Sample 2 | 2.24 | 2.24 | 2.24 | 2.24 | 2.27 | 2.28 | 2.28 | 2.29 | 2.25 | 2.25 | 0.0021 |
| Sample 3 | 2.3 | 2.33 | 2.48 | 2.4 | 2.45 | 2.47 | 2.47 | 2.47 | 2.45 | 2.45 | 0.0013 |
| | | | | | | | | | | AVG | 0.0015 |

Figure 11:
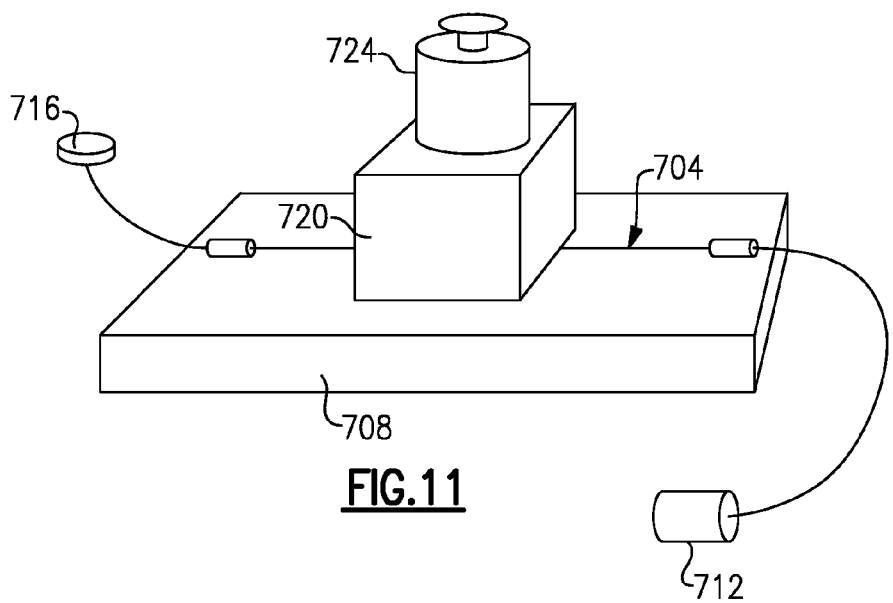
FIG. 11 is an alternate test setup for a lithium niobate fiber sensor in accordance with the invention.

Additional testing was performed using the configuration shown in FIG. 11. According to this set-up, an approximately 150 mm length of a lithium niobate cylinder fiber 704 was placed on a geofoam (expanded polystyrene foam) test bed 708. Fiber 704 was coupled to plain fibers that connected to a 1550 nm laser light source 712 at one end and a photon detector 716 at the other. A 50 mm cube of geofoam 720 was placed at the center of lithium niobate fiber 704. After light transmission and detection was initiated, predetermined amounts of weight 724 were placed on top of geofoam cube 720 and the change in light intensity was observed. The same experiment was repeated replacing the lithium niobate fiber with a plain uncoated optical fiber.

Figure 12:
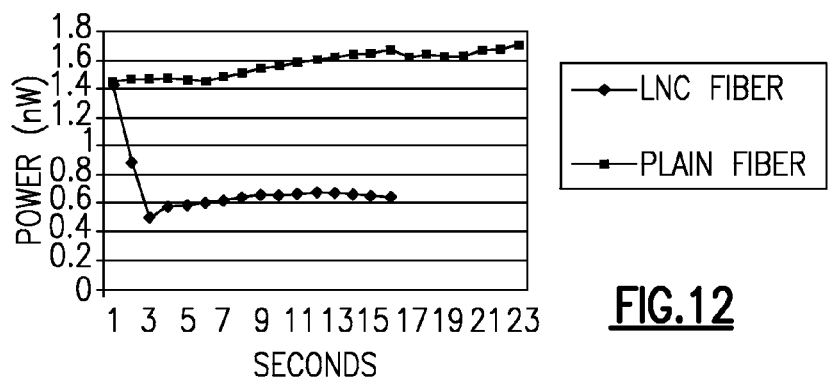
FIG. 12 is a graphical representation of data obtained using the test set-up of FIG. 11, demonstrating modulation of a lithium niobate fiber relative to a prior art optical fiber.

Results of output power immediately before and after placement of a predetermined (i.e., 50 gm) weight on geofoam cube 720 are shown in FIG. 12. The output power from light passing through the lithium niobate fiber attenuated or reduced by about 50 percent in response to pressure induced by the weight in geofoam cube 720. Once lithium niobate fiber 704 and geofoam cube 720 adjusted to the change in pressure, the output power remained relatively steady at the attenuated level. In the repeat test in which lithium niobate fiber 704 was replaced with plain optical fibers, the equivalent induced pressure produced no significant change of output power.

A geofoam medium is soft and relatively compliant. Induced pressures such as by the small applied weight load described above and shown in FIG. 11 resulted in very small strain in the geofoam and alternate lithium niobate fibers and plain fibers sandwiched between the upper and lower geofoam cubes. The observed contrast in output light attenuation between the lithium niobate fiber and plain fiber segments encapsulated by the geofoam demonstrates the lithium niobate fiber and host medium response can be calibrated to detect a wide range of strain and pressure changes that occur in a host medium. With enhancements that promote micro-bending along the fiber and localized strain development coupled with adjustments in the capture area, lithium niobate fiber-based sensors may detect a wide range of disturbances ranging from sonar to seismic waves and pedestrian to vehicle traffic, among others. Geofoam as a medium for lithium niobate fiber-based sensors offers several potential advantages. A sensor network or grid in one, two, or even three dimensions can be formed for placement in a geofoam block mold. Encapsulating geofoam of desired size can be formed to contain the sensor grid. The outer skin of the geofoam can be shaped and surfaced treated to enhance performance and provide protection. Grid crossings may be adequate to promote sufficient micro bending. Presence of multiple fibers would offer redundancy and reliability and also disturbance direction detection capability. Geofoam has very low density and high R-value. These special properties can be useful to produce a wide range of overall sensor sizes of manageable weight and very little variation in internal stress distribution due to self-weight. In addition, the high R-value of geofoam can be useful in moderating temperature changes or maintaining steady operating temperature. A sensor system consisting of lithium niobate sensors, light sources, detectors, multiplexers, microprocessor circuits and data storage or broadcast components can all be housed within a geofoam encasement.

A lithium niobate fiber can be easily integrated in existing communication fiber networks. This means lithium niobate sensors, as described above, can rely on remote light source and detection, rapid wide band data transmission or can be networked with other sensors and systems to accomplish a variety of coordinated intelligent tasks. Lithium niobate fiber does not require further treatment or processing, such as etching of plain fiber to form Bragg gratings, to function as a sensor. In addition, the drawing of the lithium niobate fibers is not substantially different than for production of plain fiber. Therefore, the unit cost of lithium niobate fiber-based sensors will be much less than other types of fiber optic pressure sensors or strain detectors. Because the above sensors rely on intensity modulation, requirements for source power and coherence can be easily met by mass-produced inexpensive power LEDs. Whereas interferometer detectors for Bragg grating sensors can cost thousands of dollars, phototransistor amplitude detectors for lithium niobate fiber sensors are also mass produced and are relatively inexpensive. Microprocessors and multiplexers or supplementary components for fiber sensors are generally mass-produced for a variety of applications and are not very expensive to build or purchase. Thus, in addition to compatibility for use in existing communication fiber networks, lithium niobate fiber sensors offer operational simplicity and remarkable cost savings of the order of 10 to 100 times less than comparable alternative fiber sensor systems.

What is claimed is:

1. An optical fiber sensor, comprising:
   a core;
   a cladding layer disposed about said core; and
   a thin layer of lithium niobate disposed at the interface between said cladding layer and said core.

2. The fiber of claim 1, wherein each of said cladding layer and said central core being made from glass materials having different indices of refraction.

3. The fiber of claim 2, wherein the index of refraction of said core is greater than the index of refraction of said cladding layer.

4. The fiber of claim 3, wherein the index of refraction of said lithium niobate layer changes based on the application of strain thereupon.

5. The fiber of claim 1, wherein said cladding layer includes a flat region.

6. The fiber of claim 5, further comprising electrodes attached to said flat region and adapted to create an electric field across said electrodes and said lithium niobate layer.

7. The fiber of claim 6, wherein said electric field is responsive to radiofrequency energy.

8. The fiber of claim 6, wherein said electric field is responsive to EMF.

9. A method of using an optical fiber sensor including a core, a cladding layer surrounding said core, and a thin film of lithium niobate disposed between said cladding layer and said core, said method comprising the steps of:
   attaching electrodes to said cladding layer;
   applying an electric field across said electrodes and said lithium niobate layer to cause the index of refraction of said lithium niobate layer to change.

10. The method of claim 9, further comprising the step of using said optical fiber sensor to detect at least one EMF source based on variations to the electric field and the resulting modulation of light passing through said fiber.

11. The method of claim 10, further comprising the step of pinpointing the location of said at least one EMF source by monitoring the degree of modulation of light passing through said fiber.

12. The method of claim 9, further comprising the step of using said optical fiber sensor to detect at least one RF source based on variations to the electric field and the resulting modulation of light passing through said fiber.

13. The method of claim 12, further comprising the step of pinpointing the location of said at least one RF source using by monitoring the degree of variation of modulation of light passing through said fiber.

14. A system for detecting stress, comprising:
   a block of geofoam;
   an optical fiber sensor embedded in said geofoam, wherein said optical fiber sensor comprises a core, a cladding layer disposed about said core, and a thin layer of lithium niobate disposed at the interface between said cladding layer and said core;
   a light source connected to one end of said optical fiber sensor; and
   a detector connected to another end of said optical fiber sensor.

15. The fiber of claim 14, wherein each of said cladding layer and said central core being made from glass materials having different indices of refraction.

16. The fiber of claim 15, wherein the index of refraction of said core is greater than the index of refraction of said cladding layer.

17. The fiber of claim 16, wherein the index of refraction of said lithium niobate layer changes based on the application of strain thereupon.

18. The fiber of claim 17, wherein said detector measures the modulation of light passing through said sensor.

19. The fiber of claim 18, wherein stress is detected based on the modulation of light passing through said sensor.

20. The fiber of claim 19, wherein stress is measured based on the amount of modulation of light passing through said sensor.

* * * * *